(12) United States Patent
Oh-Ishi et al.

(10) Patent No.: US 7,828,879 B2
(45) Date of Patent: Nov. 9, 2010

(54) CARBON DIOXIDE ABSORBING MATERIAL, METHOD FOR PRODUCING CARBON DIOXIDE ABSORBING MATERIAL, METHOD FOR ABSORBING CARBON DIOXIDE, AND APPARATUS FOR ABSORBING CARBON DIOXIDE

(75) Inventors: Katsuyoshi Oh-Ishi, Tokyo (JP); Nobuaki Togashi, Yokohama (JP)

(73) Assignee: Chuo University, Tokyo (JP)

( * ) Notice: Subject to any disclaimer, the term of this patent is extended or adjusted under 35 U.S.C. 154(b) by 239 days.

(21) Appl. No.: 11/991,934

(22) PCT Filed: Sep. 15, 2006

(86) PCT No.: PCT/JP2006/318423
§ 371 (c)(1),
(2), (4) Date: Mar. 13, 2008

(87) PCT Pub. No.: WO2007/032494
PCT Pub. Date: Mar. 22, 2007

(65) Prior Publication Data
US 2009/0107334 A1    Apr. 30, 2009

(30) Foreign Application Priority Data
Sep. 16, 2005    (JP) ............... 2005-271243

(51) Int. Cl.
*B01D 53/04*    (2006.01)
(52) U.S. Cl. ............... 95/139; 95/90; 96/108; 96/154; 502/400
(58) Field of Classification Search ............ 95/90, 95/139; 96/108, 154; 502/400
See application file for complete search history.

(56) References Cited

U.S. PATENT DOCUMENTS 4,015,054 A    3/1977    Cleaver et al.

(Continued)

FOREIGN PATENT DOCUMENTS

GB    2 150 543 A    7/1985

(Continued)

OTHER PUBLICATIONS

Kleykamp H., "Phase equilibria in the Li-Ti-O system and physical properties of $Li_2 TiO_3$", Fusion Engineering and Design, Elsevier Science Publishers, Amsterdam, NL, vol. 61-62, Nov. 1, 2002, pp. 361-366.

(Continued)

*Primary Examiner*—Robert J Hill, Jr.
*Assistant Examiner*—Christopher P Jones
(74) *Attorney, Agent, or Firm*—Oliff & Berridge, PLC

(57) ABSTRACT

A carbon dioxide-absorbing material containing lithium titanate, the lithium titanate comprising 70 mol % or more of $Li_4TiO_4$ and 30 mol % or less of $Li_2TiO_3$. Furthermore, the carbon dioxide-absorbing material is obtained by the method for producing a carbon dioxide-absorbing material described below. That is, the absorbing material is obtained by the production method which produces the same by mixing given raw materials such that the atomic ratio between lithium and titanium is from 3.5 to 5.0, and subjecting the resulting mixture to heat treatment. The method for absorbing carbon dioxide includes a carbon dioxide absorption step. The apparatus for absorbing carbon dioxide is provided with carbon dioxide absorption means that absorbs carbon dioxide in the carbon dioxide-absorbing material.

16 Claims, 4 Drawing Sheets

U.S. PATENT DOCUMENTS

| | | | |
|---|---|---|---|
| 2005/0214203 A1* | 9/2005 | Essaki et al. | 423/651 |
| 2007/0072768 A1* | 3/2007 | Essaki et al. | 502/400 |
| 2007/0072769 A1* | 3/2007 | Imada et al. | 502/411 |
| 2007/0238611 A1* | 10/2007 | Imada et al. | 502/400 |

FOREIGN PATENT DOCUMENTS

| | | |
|---|---|---|
| JP | A-61-043401 | 3/1986 |
| JP | A-08-029369 | 2/1996 |
| JP | A-10-247496 | 9/1998 |
| JP | A-2002-357586 | 12/2002 |

OTHER PUBLICATIONS

Dec. 18, 2009 European Search Report issued in EP 06810215.1.

Nakagawa; "The Development of $CO_2$ absorbing Ceramics;" *Ceramics*; vol. 37; 2002; pp. 876-879 (partial translation).

Dubey et al.; "Preparation of $Li_4TiO_4$ Containing Tetrahedrally Coordinated $Ti^{4+}$;" *Nature Physical Science*; vol. 235; (1972); pp. 155-156.

Gunawardane et al.; "Crystal Structure Refinement of $Li_4TiO_4$ Containing Tetrahedrally Coordinated $Ti^{4+}$ and Tetragonally Packed Oxide Ions;" *Journal of Solid State Chemistry*; vol. 112; (1994); pp. 70-72.

Kolotyrkjn et al.; "Ethalpy of formation of lithium orthotitanate;" *Izvestiya Akademii Nauk SSSR*; vol. 16; (1980); p. 1308.

Togashi et al.; "Research on $CO_2$ Absorption Behavior of a New $CO_2$ Absorbent $Li_4TiO_4$ with the maximum $CO_2$ absorption of 42.11 mass %;" *The Ceramic Society of Japan Shuki Sympsium Koen Ykoshu*; 18th Ed.; (2005); p. 163.

* cited by examiner

CARBON DIOXIDE ABSORBING MATERIAL, METHOD FOR PRODUCING CARBON DIOXIDE ABSORBING MATERIAL, METHOD FOR ABSORBING CARBON DIOXIDE, AND APPARATUS FOR ABSORBING CARBON DIOXIDE

TECHNICAL FIELD

The present invention relates to a carbon dioxide-absorbing material, a method for producing a carbon dioxide-absorbing material, a method for absorbing carbon dioxide, and an apparatus for absorbing carbon dioxide. In particular, it relates to a carbon dioxide-absorbing material which is useful to absorb and fix carbon dioxide ($CO_2$) which contributes to global warming, a method for producing the same, a method for absorbing carbon dioxide, and an apparatus for absorbing carbon dioxide.

BACKGROUND ART

In recent years, it has been desired to reduce emissions of greenhouse gases to prevent global warming. It is further required to reduce carbon dioxide ($CO_2$) occupying a major part of greenhouse gases. Technological development for reduction of carbon dioxide is classified into three fields of improvement in energy conversion efficiency, exploration and development of new energy, and collection and sequestration of carbon dioxide.

Among these, regarding collection and sequestration of carbon dioxide, particularly research and development of a carbon dioxide-absorbing material that can efficiently absorb carbon dioxide has been recently carried out actively.

It has been found in research of fuel cells that regarding stabilization of ceramics in a molten carbonate, a lithium composite oxide and carbon dioxide are reacted to form an oxide and lithium carbonate. Non-Patent Document 1 describes the following contents. Lithium zirconate ($Li_2ZrO_3$) as a lithium composite oxide is reacted with carbon dioxide at the low temperature side of a boundary of about 700° C. and converted into zirconium oxide ($ZrO_2$), and the zirconium oxide releases carbon dioxide at the high temperature side and reverts to lithium zirconate. It is further described that other than the lithium zirconate, lithium silicate ($Li_4SiO_4$) shows similar reaction behavior.

Non-Patent Document 2 and Non-Patent Document 3 describe a production example of lithium titanate ($Li_4TiO_4$) and that $Li_4TiO_4$ obtained by the production method has a high property for absorbing carbon dioxide.

However, according to experiments by the present inventors, the $Li_2ZrO_3$ described in Non-Patent Document 1 could only absorb carbon dioxide in an amount of 23% by mass with respect to 100 g of $Li_2ZrO_3$(S).

Furthermore, when the maximum absorption amount of carbon dioxide in the lithium silicate ($Li_4SiO_4$) described in Non-Patent Document 1 is theoretically obtained from the following chemical formula (1), the amount is 36.72% by mass.

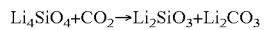   Chemical formula (1)

When the maximum absorption amount of carbon dioxide in the $Li_4TiO_4$ described in Non-Patent Documents 2 and 3 is theoretically obtained from the following chemical formula (2), the amount is 31.55% by mass.

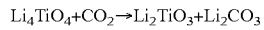   Chemical formula (2)

However, the $Li_4TiO_4$ obtained by the methods described in Non-Patent Documents 2 and 3 does not actually exhibit the theoretical maximum absorption amount of carbon dioxide, and the amount did not exceed about 21% by mass.

Non-Patent Document 1: Ceramics 37 (2002) No. 11
Non-Patent Document 2: B. L. Dubey and A. R. West, Nature Physical Science, vol. 235, Feb. 21, 1972
Non-Patent Document 3: R. P. Gunawardane, et al., J. Solid State Chem 112, 70-72 (1994)

DISCLOSURE OF THE INVENTION

Problems that the Invention is to Solve

The present invention has an object to solve the above problems. That is, the invention has an object to provide a carbon dioxide-absorbing material that can greatly improve absorption amount of carbon dioxide up to near the theoretical value, a method for producing the carbon dioxide-absorbing material, a method of absorbing carbon dioxide using the carbon dioxide-absorbing material, and an apparatus for absorbing carbon dioxide.

Means for Solving the Problems

As a result of keen investigations to solve the above problems, the present inventors have reached the present invention described below and have found that the problems can be solved.

(1) A carbon dioxide-absorbing material comprising lithium titanate, the lithium titanate comprising 70 mol % or more of $Li_4TiO_4$ and 30 mol % or less of $Li_2TiO_3$.

(2) A carbon dioxide-absorbing material comprising lithium titanate which is obtained by mixing a lithium carbonate powder or a lithium oxide powder with a titanium dioxide powder such that an atomic ratio (Li/Ti) between lithium and titanium is from 3.5 to 5.0, and subjecting the resulting mixture to a heat treatment at 500 to 1,000° C. in a reducing gas or an inert gas containing a reducing gas.

(3) The carbon dioxide-absorbing material as described in (2), wherein the reducing gas is contained in the inert gas in an amount of 8 vol % or more.

(4) The carbon dioxide-absorbing material as described in (2) or (3), wherein the reducing gas comprises at least one gas selected from the group consisting of hydrogen, ammonia, hydrogen carbide and carbon monoxide.

(5) The carbon dioxide-absorbing material as described in (4), wherein the reducing gas comprises hydrogen gas.

(6) A method for producing a carbon dioxide-absorbing material, which comprises a mixing step of mixing a lithium carbonate powder or a lithium oxide powder with a titanium dioxide powder such that an atomic ratio (Li/Ti) between lithium and titanium is from 3.5 to 5.0, and a heat treatment step of subjecting the resulting mixture to a heat treatment at 500 to 1,000° C. in a reducing gas or an inert gas containing a reducing gas.

(7) The method for producing a carbon dioxide-absorbing material as described in (6), wherein the reducing gas is contained in the inert gas in an amount of 8 vol % or more.

(8) The method for producing a carbon dioxide-absorbing material as described in (6) or (7), wherein the reducing gas comprises at least one gas selected from the group consisting of hydrogen, ammonia, hydrocarbon and carbon monoxide.

(9) The method for producing a carbon dioxide-absorbing material as described in (8), wherein the reducing gas contains hydrogen gas.

(10) The method for producing a carbon dioxide-absorbing material as described in (8), wherein the reducing gas contains ammonia gas.

(11) A method for absorbing carbon dioxide, comprising absorbing carbon dioxide in the carbon dioxide-absorbing material as described in any one of (1) to (5), wherein the temperature of the carbon dioxide-absorbing material is from 600 to 860° C.

(12) An apparatus for absorbing carbon dioxide, comprising carbon dioxide-absorbing means that absorbs carbon dioxide in the carbon dioxide-absorbing material as described in any one of (1) to (5).

EFFECT OF THE INVENTION

The present invention can provide a carbon dioxide-absorbing material that can greatly improve absorption amount of carbon dioxide up to near the theoretical value, a method for producing the carbon dioxide-absorbing material, a method of absorbing carbon dioxide using the carbon dioxide-absorbing material, and an apparatus for absorbing carbon dioxide.

BEST MODE FOR CARRYING OUT THE INVENTION

Carbon Dioxide-Absorbing Material

Figure 1:
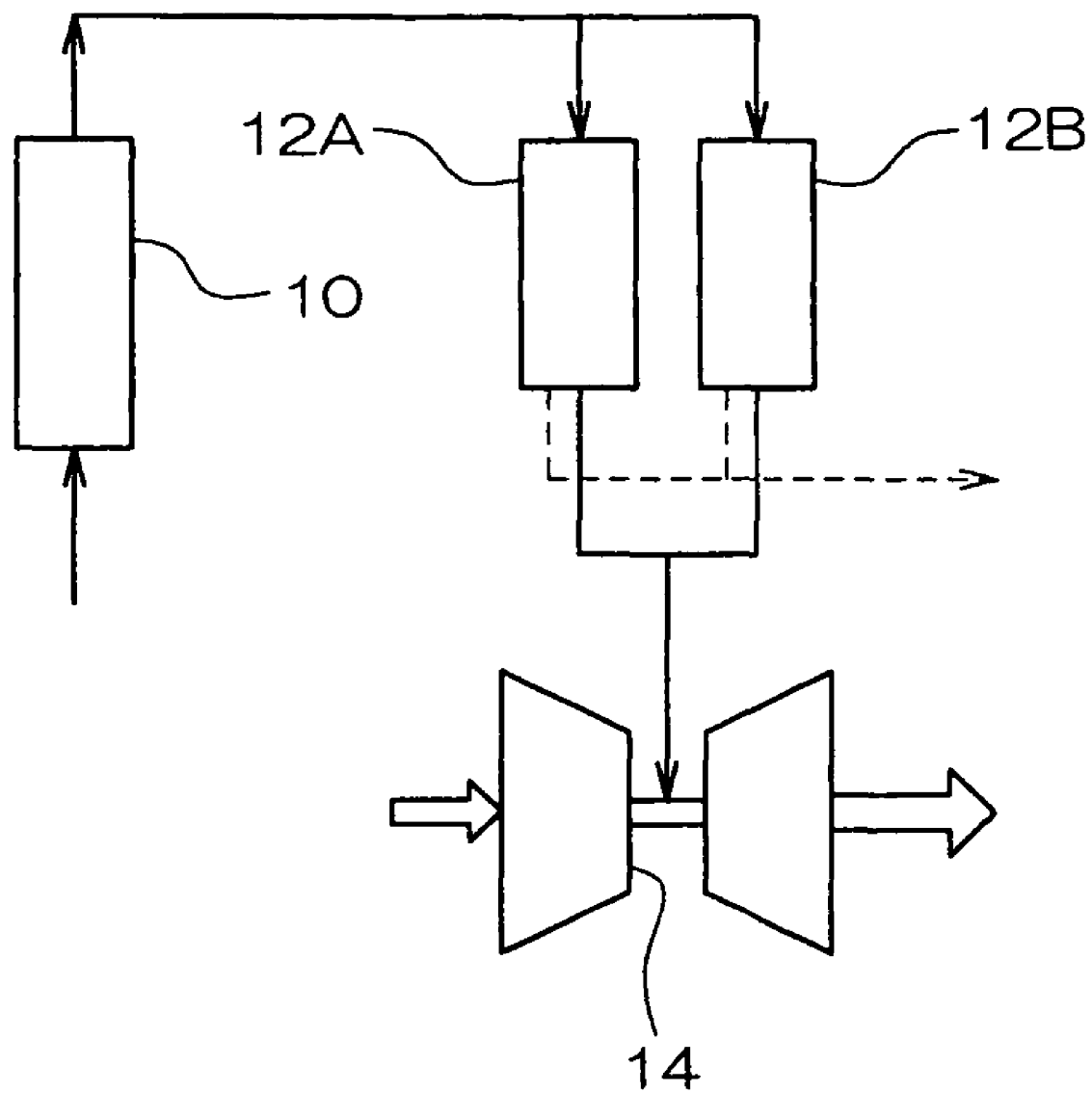
FIG. 1 is a skeleton framework showing the preferred one embodiment of the apparatus for absorbing carbon dioxide of the present invention.

The carbon dioxide-absorbing material of the present invention contains lithium titanate obtained by mixing a lithium carbonate powder or a lithium oxide powder (hereinafter referred to as a lithium-based powder) with a titanium dioxide powder such that an atomic ratio (Li/Ti) between lithium and titanium is from 3.5 to 5.0, and then subjecting the resulting mixture to a heat treatment at 500 to 1,000° C. in a reducing gas or an inert gas containing the reducing gas.

The carbon dioxide-absorbing material of the invention can absorb carbon dioxide in gases such as emission gas in an extremely large amount and at high rate, and therefore can effectively suppress emission of carbon dioxide as greenhouse gas into the atmosphere.

The carbon dioxide-absorbing material of the invention comprises lithium titanate, the lithium titanate comprising 70 mol % or more of $Li_4TiO_4$ and 30 mol % or less of $Li_2TiO_3$.

From the viewpoint of absorption effect of carbon dioxide, the content of $Li_2TiO_3$ is preferred to be small. The content of $Li_2TiO_3$ is preferably 25 mol % or less, more preferably 10 mol % or less, and further preferably 0 mol % (that is, $Li_4TiO_4$ is 100 mol %). Where the content of $Li_2TiO_3$ in the carbon dioxide-absorbing material exceeds 30 mol %, the effect of absorbing carbon dioxide from gases cannot be maintained at the desired value (value substantially equal to the theoretical value). Confirmation method of $Li_4TiO_4$ and $Li_2TiO_3$ in the carbon dioxide-absorbing material includes X-ray diffraction measurement. Furthermore, the content (mol %) of those can be determined by intensity ratio of X-ray diffraction peak of each material.

The carbon dioxide-absorbing material of the invention has electrical resistivity of preferably 70 MΩ·cm or less, more preferably 35 MΩ·cm or less, and further preferably 7 MΩ·cm or less. Where the electrical resistivity exceeds 70 MΩ·cm, $Li_2TiO_3$ and $LiTiO_2$ that do not absorb carbon dioxide, other than $Li_4TiO_4$, are present in the material, and it may be difficult to greatly improve the carbon dioxide absorption effect.

The carbon dioxide-absorbing material of the invention has thermal diffusivity of preferably $10 \times 10^{-3}$ $cm^2 \cdot s^{-1}$ or less, more preferably $7 \times 10^{-3}$ $cm^2 \cdot s^{-1}$ or less, and further preferably $5 \times 10^{-3}$ $cm^2 \cdot s^{-1}$ or less. Where the thermal diffusivity of the carbon dioxide-absorbing material exceeds $10 \times 10^{-3}$ $cm^2 \cdot s^{-1}$, the carbon dioxide absorption effect of the carbon dioxide-absorbing material may be deficient.

(Method for Producing Carbon Dioxide-Absorbing Material)

The carbon dioxide-absorbing material of the invention includes a mixing step of mixing the lithium-based powder with a titanium dioxide powder such that an atomic ratio (Li/Ti) between lithium and titanium is from 3.5 to 5.0, and a heat treatment step of subjecting the resulting mixture to a heat treatment at 500 to 1,000° C. in a reducing gas or an inert gas containing the reducing gas. According to the method for producing a carbon dioxide-absorbing material of the invention, the carbon dioxide-absorbing material that can absorb carbon dioxide in a large amount and at high rate can surely and easily be produced. Each step is explained below.

(1) Mixing Step:

The lithium-based powder has an average particle size of preferably from 0.1 to 10 μm, more preferably from 0.5 to 5 μm, and further preferably from 1 to 3 μm. Where the average particle size is smaller than 0.1 μm, the problem may occur in weighing those powders at the time of the production. On the other hand, where the average particle size is larger than 10 μm, reaction among the lithium-based powder, hydrogen gas and the titanium dioxide powder may be disturbed in the heat treatment step. The average particle size can be determined by a laser diffraction-type particle size distribution measurement device.

The titanium dioxide powder has an average particle size of preferably from 0.1 to 10 μm, more preferably from 0.3 to 1 μm, and further preferably from 0.5 to 0.8 μm. Where the average particle size of the titanium dioxide powder is smaller than 0.1, the problem may occur in weighing those powders at the time of the production. On the other hand, where the average particle size is larger than 10 μm, reaction among the titanium dioxide powder, hydrogen gas and the lithium-based powder may be disturbed in the heat treatment step.

The mixing molar ratio between the lithium-based powder and titanium dioxide (lithium-based powder:titanium dioxide) is preferably from 3.8:1.5 to 3.0:1, more preferably from 2.5:1.5 to 2.0:1, and further preferably 2:1. Where the mixing ratio is fallen outside the above range, formation amount of $Li_4TiO_4$ may remarkably be decreased.

(2) Heat-Treatment Step:

The mixed powder is heat treated in a reducing gas or in an inert gas containing a reducing gas. The inert gas is not particularly limited, but nitrogen gas, helium gas, argon gas and the like are preferred. It is preferred that the reducing gas contains at least one gas selected from the group consisting of hydrogen, ammonia, hydrocarbon (such as methane) and carbon monoxide. Above all, it is preferred to contain hydrogen gas or ammonia gas. The reducing gas is contained in the inert gas in an amount of preferably 8 vol % or more, more preferably 10 vol % or more, and further preferably 20 vol % or more. Where the content of hydrogen gas is less than 8 vol %, the carbon dioxide absorption effect of the carbon dioxide-absorbing material finally obtained may not sufficiently be exhibited.

The heat treatment temperature is from 500 to 1,000° C., preferably from 550 to 1,000° C., more preferably from 750 to 900° C., and further preferably from 750 to 800° C. The heat treatment time is preferably from 6 to 24 hours, more preferably from 10 to 20 hours, and further preferably from 12 to 15 hours. Where the heat treatment temperature is lower than 500° C., the temperature is too low, and $Li_4TiO_4$ may not be formed. Where the heat treatment temperature exceeds 1,000° C., $Li_4TiO_4$ formed may be decomposed.

The temperature-rising rate of from ordinary temperatures to the heat treatment temperature in the heat treatment is preferably from 1 to 10° C./min, more preferably from 3 to 8° C./min, and further preferably from 4 to 5° C./min. Where the temperature-rising rate is smaller than 1° C./min, it may not correspond to industrial costs such as electric power cost. Where the temperature-rising rate is larger than 10° C./min, the yield of $Li_4TiO_4$ may be decreased.

The sample thus obtained is ground and mixed, and then heat treated under the same conditions as described above, thereby obtaining a lithium titanate powder. Next, the powder is subjected to pressing to obtain a formed product having a given porosity. It is necessary to suppress pressure loss and to have a certain extent of strength when forming a porous body from a powder. From this fact, the reaction proceeds sufficiently when the porosity is from about 30 to 70%. The form of the carbon dioxide-absorbing material should arbitrarily be selected according to applications of the carbon dioxide-absorbing material. Examples of the form include a powder, pellets, a ball having a diameter of several mm.

The above-described carbon dioxide-absorbing material of the invention can effectively be used in various fields, utilizing its properties. The carbon dioxide-absorbing material can be applied to, for example, applications shown in 1) to 4).

1) It is effective to absorb carbon dioxide generated from blast furnaces of electric power plants and ironworks, and the like.

2) In recent years, hydrogen ($H_2$) is noted as a fuel cleaner than methane ($CH_4$), propane ($CH_3CH_2CH_3$) and the like. When hydrogen ($H_2$) is burned, a material generated is water ($H_2O$). Therefore, hydrogen is considered to be clean fuel. Hydrogen is obtained by steam reforming of methane as shown in the following formulae (A) and (B).

$$CH_4 + H_2O \leftrightarrow 3H_2 + CO \qquad \text{Formula (A)}$$

$$CO + H_2O \leftrightarrow H_2 + CO_2 \qquad \text{Formula (B)}$$

When the carbon dioxide-absorbing material of the invention is arranged in a region that those reactions take place, carbon dioxide is absorbed in the carbon dioxide-absorbing material, and carbon dioxide is decreased from a gas, in the reaction represented by the above formula (B). As a result, the reaction represented by the formula (B) proceeds further actively, and as a result, $H_2$ is fast increased.

3) The carbon dioxide-absorbing material removes only carbon dioxide from a mixed gas containing carbon dioxide as impurity, and therefore can be used to increase purity of a mixed gas.

4) In recent years, carbon dioxide is transported with a metal-made cylinder having large mass (heavy). Where carbon dioxide is transported in a state that carbon dioxide is absorbed in the carbon dioxide-absorbing material of the invention ($Li_2CO_3$), a large amount of carbon dioxide can be absorbed in the carbon dioxide-absorbing material of the invention. As a result, weight saving and safety of transportation means are increased. After the transportation, $Li_2CO_3$ is heated at the desired place, and carbon dioxide can be collected.

(Method for Absorbing Carbon Dioxide)

The method for absorbing carbon dioxide of the invention includes a carbon dioxide absorption step of absorbing carbon dioxide in a carbon dioxide-absorbing material. In the carbon dioxide absorption step, the carbon dioxide-absorbing material is set to a temperature of from 600 to 860° C., and preferably from 700 to 860° C. Where the temperature is lower than 600° C., the carbon dioxide-absorbing material cannot sufficiently absorb carbon dioxide. Where the temperature exceeds 860° C., the equilibrium moves to the discharge side of carbon dioxide than the absorption side thereof. Considering the above-described temperature range, carbon dioxide can selectively be absorbed and removed from high temperature exhaust gas, reformed fuel gas before burning, and the like.

(Apparatus for Absorbing Carbon Dioxide)

The apparatus for absorbing carbon dioxide of the invention is provided with carbon dioxide absorption means that absorbs carbon dioxide in the carbon dioxide-absorbing material of the invention. The method for absorbing carbon dioxide of the invention can be carried out by the apparatus for absorbing carbon dioxide of the invention. According to the apparatus, carbon dioxide in gases such as exhaust gas can efficiently be absorbed in large amount and at high rate. Additionally, carbon dioxide absorbed is released from the carbon dioxide-absorbing material, and the carbon dioxide-absorbing material can be reused. Furthermore, the carbon dioxide-absorbing material of the invention can control absorption and release of carbon dioxide by temperature. As a result, the apparatus for absorbing carbon dioxide can be constituted of one apparatus containing the carbon dioxide-absorbing material.

The preferred embodiment of the apparatus for absorbing carbon dioxide of the invention is illustrated in FIG. 1. FIG. 1 is an example of electrical power plant combined with a fuel reforming process. In FIG. 1, reference numeral 10 is a reformer. Reference numeral 12A and reference numeral 12B are carbon dioxide separators, and those separators are filled with the carbon dioxide-absorbing material of the invention. Reference numeral 14 is a combustor.

In the electrical power plant shown in FIG. 1, temperature of a fuel gas is close to a carbon dioxide absorption temperature (600 to 860° C.) of the carbon dioxide-absorbing material of the invention. Therefore, the fuel gas is directly introduced into the reformer 10. The reformed gas generally contains $H_2$, CO, $CO_2$ and $H_2O$.

When the plant is constituted such that a gas inlet of the carbon dioxide separator 12B is closed and a gas containing carbon dioxide is introduced into the carbon dioxide separator 12A, carbon dioxide in the gas introduced is efficiently absorbed in and fixed to the carbon dioxide-absorbing material in the carbon dioxide separator 12A (carbon dioxide absorption step). When carbon dioxide absorption in the carbon dioxide separator 12A is saturated, an inlet of a gas into the carbon dioxide separator 12A is closed and the gas inlet of the carbon dioxide separator 12B is opened. Carbon dioxide in the gas introduced into the carbon dioxide separator 12B is efficiently absorbed in and fixed to the carbon dioxide-absorbing material in the carbon dioxide separator 12B, similar to the case of the carbon dioxide separator 12A.

On the other hand, in the carbon dioxide separator 12A in which carbon dioxide absorption has been saturated, treatment for releasing carbon dioxide absorbed in and fixed to the carbon dioxide-absorbing material is conducted. After completion of the release of carbon dioxide, a gas is again introduced into the carbon dioxide separator 12A and treatment for releasing carbon dioxide absorbed in and fixed to the carbon dioxide-absorbing material is conducted in the carbon dioxide separator 12B. When such an operation is repeated, absorption and separation of carbon dioxide can be conducted continuously.

In releasing carbon dioxide absorbed in and fixed to the carbon dioxide-absorbing material, it is preferred that the inside of the saturated carbon dioxide separator 12A is maintained at a temperature region of 900° C. or higher. By this, the carbon dioxide-absorbing material is regenerated, and a gas is again introduced into the carbon dioxide separator 12A as described above. A gas which does not contain carbon dioxide is supplied to other facilities as shown by a solid line arrow in FIG. 1.

Carbon dioxide released from the carbon dioxide-absorbing materials respectively filled in the carbon dioxide separator 12A and the carbon dioxide separator 12B is collected as shown by a dotted line arrow in FIG. 1, and utilized in facilities requiring carbon dioxide.

The above-described carbon dioxide absorption and separation apparatus is one example of the carbon dioxide absorption and separation apparatus of the invention, and the invention is not limited so long as it is a process that absorbs and fix-carbon dioxide in a gas, taking advantage of properties of the carbon dioxide-absorbing material of the invention, and then separates carbon dioxide from the carbon dioxide-absorbing material.

EXAMPLES

The present invention is described in detail below by referring to the Examples, but the invention is not limited to those Examples.

Example 1

Figure 2:
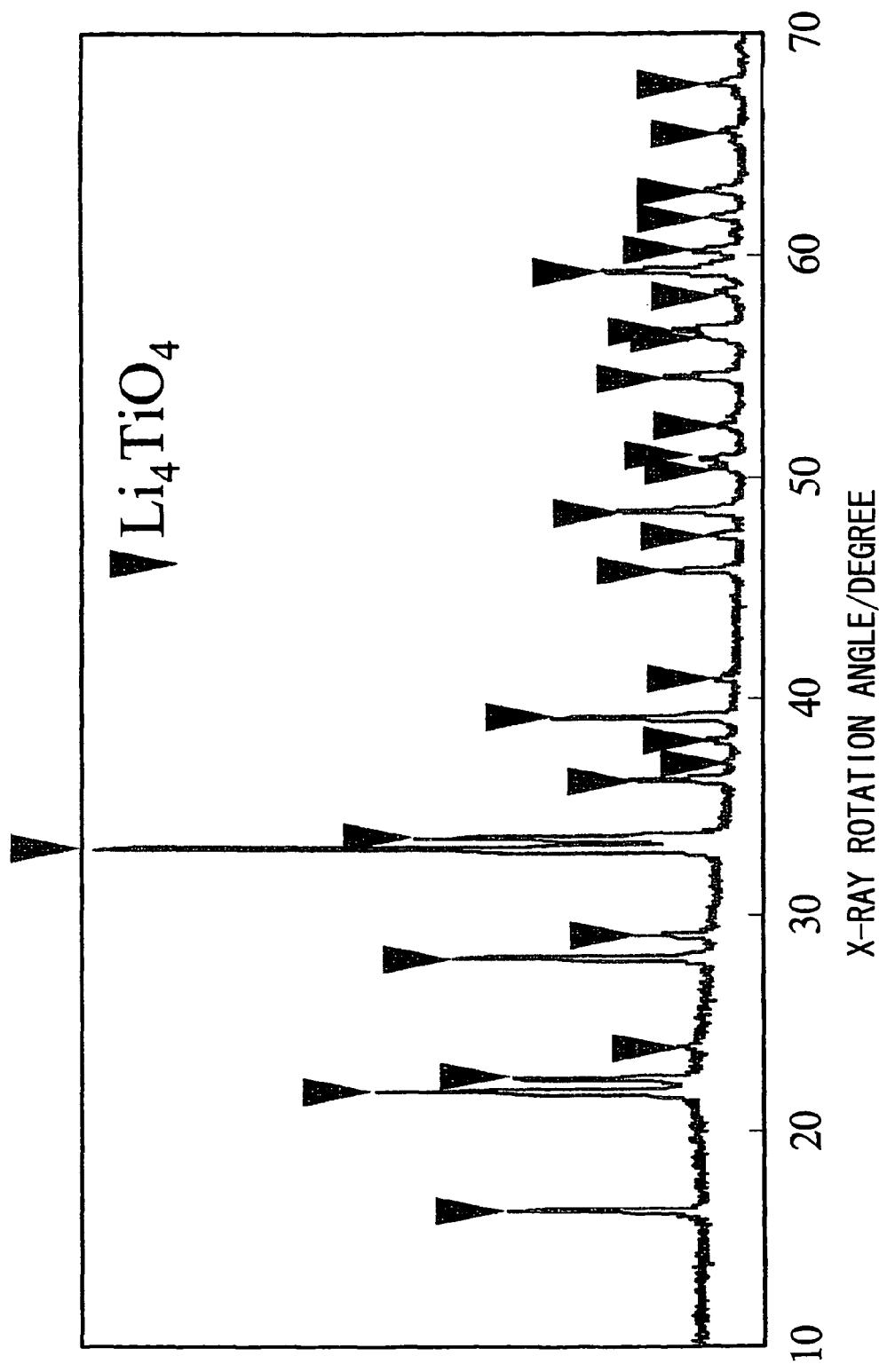
FIG. 2 is X-ray diffraction chart of lithium titanate in Example 1.

A lithium carbonate powder having an average particle size of 1 μm and a titanium dioxide powder having an average particle size of 0.8 μm were weighed such that the molar ratio (lithium carbonate:titanium dioxide) is 2:1, and were dry mixed with an agate mortar for 1 hour. The mixed powder obtained was placed on a gold foil, and then subjected to heat treatment by rising a temperature from ordinary temperature (25° C.) to 900° at a temperature-rising rate of 5° C./min in a helium atmosphere containing 20 vol % of hydrogen in a box-type electric furnace, and then at 900° C. for 12 hours. The sample obtained by the heat treatment was ground and mixed, and then again heat treated under the same conditions to obtain a lithium titanate powder. Subsequently, the lithium titanate powder was charged in a mold having a diameter of 12 mm, and pressed to prepare a formed product having a porosity of 40%. X-ray diffraction pattern of lithium titanate is shown in FIG. 2.

Example 2

Figure 3:
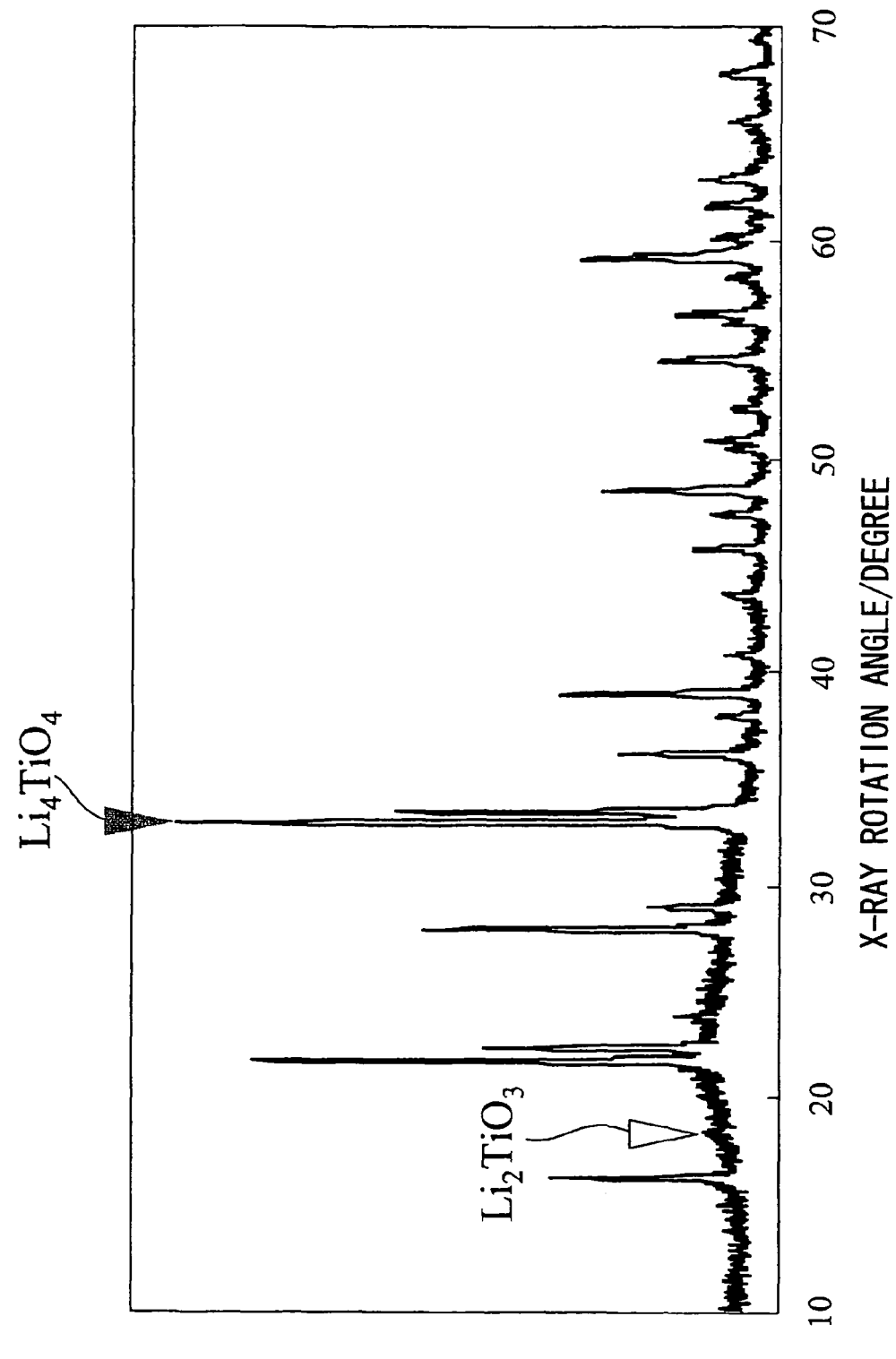
FIG. 3 is X-ray diffraction chart of lithium titanate in Example 2.

A formed product was prepared in the same manner as in Example 1, except for changing the helium atmosphere containing 20 vol % of hydrogen to an argon atmosphere containing 10 vol % of hydrogen. X-ray diffraction pattern of lithium titanate is shown in FIG. 3.

Example 3

A formed product was prepared in the same manner as in Example 1, except for changing the helium atmosphere containing 20 vol % of hydrogen to a helium atmosphere containing 8 vol % of hydrogen.

Example 4

A formed product was prepared in the same manner as in Example 1, except for using $Li_2O$ in place of $Li_2CO_3$.

Example 5

A formed product was prepared in the same manner as in Example 1, except for changing the helium atmosphere containing 20 vol % of hydrogen to a helium atmosphere containing 20 vol % of ammonia gas.

Example 6

A formed product was prepared in the same manner as in Example 2, except for changing the argon gas atmosphere containing 10 vol % of hydrogen to a nitrogen gas atmosphere containing 10 vol % of hydrogen.

Comparative Example 1

A formed product was prepared in the same manner as in Example 1, except for changing the helium atmosphere containing 20 vol % of hydrogen to an argon gas atmosphere containing 5 vol % of hydrogen.

Comparative Example 2

A formed product was prepared in the same manner as in Example 1, except for changing the helium atmosphere containing 20 vol % of hydrogen to an argon atmosphere. The synthesis conditions were according to B. L. Dubey and A. R. West, Nature Physical Science, vol. 235, Feb. 21, 1972.

Comparative Example 3

A formed product was prepared in the same manner as in Example 1, except for rising the temperature between 500° C. and 700° C. at a temperature-rising rate of 1° C./min in an argon atmosphere. The synthesis conditions were according to R. P. Gunawardane, et al., J. Solid State Chem 112, 70-72 (1994).

Comparative Example 4

A lithium carbonate powder having an average particle size of 1 μm and a silicon oxide powder having an average particle size of 0.3 μm were weighed such that the molar ratio (lithium carbonate:silicon oxide) is 2:1, and were dry mixed with an agate mortar for 1 hour. The mixed powder obtained was subjected to heat treatment by rising a temperature from ordinary temperature to 900° at a temperature-rising rate of 5° C./min in the atmosphere in a box-type electric furnace, and then at 900° C. for 12 hours. The sample obtained by the heat treatment was ground and mixed, and then again heat treated under the same synthesis conditions to obtain a lithium silicate powder. Subsequently, the lithium silicate powder was charged in a mold having a diameter of 12 mm, and pressed to prepare a formed product having a porosity of 40%.

Comparative Example 5

A lithium carbonate powder having an average particle size of 1 μm and a germanium oxide powder having an average particle size of 0.3 μm were weighed such that the molar ratio (lithium carbonate:germanium oxide) is 2:1, and were dry mixed with an agate mortar for 1 hour. The mixed powder obtained was subjected to heat treatment by rising a temperature from ordinary temperature to 900° at a temperature-rising rate of 5° C./min in the atmosphere in a box-type electric furnace, and then at 900° C. for 12 hours. The sample obtained by the heat treatment was ground and mixed, and then again heat treated under the same synthesis conditions to obtain a lithium germanate powder. Subsequently, the lithium germanate powder was charged in a mold having a diameter of 12 mm, and pressed to prepare a formed product having a porosity of 40%.

Regarding the formed products (carbon dioxide-absorbing materials) obtained in Examples 1 to 6 and Comparative Examples 1 to 5, $Li_2TiO_3$ content in the carbon dioxide-absorbing material, carbon dioxide maximum absorption, and carbon dioxide maximum absorption volume in 1 $cm^3$ of the carbon dioxide-absorbing material were respectively measured as follows.

(Content of $Li_2TiO_3$ in Carbon Dioxide-Absorbing Material)

The content of $Li_2TiO_3$ was measured as follows. The absorbing materials prepared in Examples 1 to 6 and Comparative Examples 1 to 3 were ground in an agate mortar such that the average particle size is about 1 μm. The resulting powders were subjected to a powder X-ray diffractometer (a product of Rigaku Corporation, RINT 2100 Model), and (202) diffraction peak intensity of $Li_4TiO_4$ and (002) diffraction peak intensity of $Li_2TiO_3$ in the absorbing materials at ordinary temperature were examined. The results are shown in Table 1. Regarding Comparative Example 4 and Comparative Example 5, the content of $Li_2TiO_3$ is not measured, since Comparative Example 4 and Comparative Example 5 have different compositions.

(Carbon Dioxide Maximum Absorption)

The carbon dioxide-absorbing materials obtained in Examples 1 to 6 and Comparative Examples 1 to 5 were placed in a box-type electric furnace. While passing a mixed gas comprising 20 vol % of carbon dioxide gas and 80 vol % of nitrogen gas through the electric furnace, the absorbing materials of Examples 1 to 6 and Comparative Examples 1 to 3 were held at a temperature of 850° C. for 1 hour, the absorbing materials of Comparative Examples 4 to 5 were held at a temperature of 690° C. for 1 hour, and mass increase of the absorbing materials before and after the heat treatment was examined. Thus, the absorption amount of carbon dioxide was measured. The temperature reaching the maximum absorption was 850° C. in Examples 1 to 6 and Comparative Examples 1 to 3, and 690° C. in Comparative Examples 4 to 5. The absorption amount measured was divided by the mass of the sample used for measurement to obtain the carbon dioxide maximum absorption (mass %) per 1 g of the sample. The results are shown in Table 1 below, respectively.

Increase of the carbon dioxide absorption amount in Example 1 was estimated due to the following chemical formula (3), and was nearly equal to the maximum absorption amount 44.41% by mass that is the theoretical value of this reaction formula.

$$2Li_4TiO_4 + 3CO_2 \rightarrow 2LiTiO_2 + 3Li_2CO_3 + \tfrac{1}{2}O_2 \quad \text{Chemical formula (3)}$$

When the measurement was conducted in the same manner as in the above measurement, except that only nitrogen gas is supplied to the electric furnace having the absorbing material placed therein, mass increase of the absorbing material was not found at all.

(Carbon Dioxide Maximum Absorption Volume in 1 $cm^3$ of Carbon Dioxide-Absorbing Material)

The absorbing materials obtained in the methods of Examples 1 to 6 and Comparative Examples 1 to 5 were ground so as to have the same volume, placed in a cylindrical container having an outer diameter of 50 mm and a height of 200 mm, and heat treated at 800° C. for 1 hour in nitrogen gas, followed by conducting vacuum suction to 0.1 Torr (13.3 Pa) by a rotary pump. Subsequently, carbon dioxide was introduced into the container until reaching the atmospheric pressure, the absorbing materials of Examples 1 to 6 and Comparative Examples 1 to 3 were held at a temperature of 850° C. for 3 hour, and the absorbing materials of Comparative Examples 4 to 5 were held at a temperature of 690° C. for 3 hour. The airtightness of the container is maintained, and when the carbon dioxide-absorbing material absorbs carbon dioxide, pressure in the container drops. Therefore, those reduced pressure values were recorded, and the volume of carbon dioxide absorbed was estimated from the pressure difference. The results are shown in Table 1 below.

TABLE 1

| | Raw materials | Molar ratio of raw materials | Gas atmosphere (vol %) | Content of $Li_2TiO_3$ in absorbing material (mol %) | Carbon dioxide maximum absorption (mass %) | Carbon dioxide maximum absorption volume in 1 $cm^3$ of absorbing material ($cm^3$) |
|---|---|---|---|---|---|---|
| Example 1 | $Li_2CO_3$:$TiO_2$ | 2:1 | $H_2$:He = 20:80 | 0 | 43.1 | 612 |
| Example 2 | $Li_2CO_3$:$TiO_2$ | 2:1 | $H_2$:Ar = 10:90 | 5 | 39.3 | 558 |
| Example 3 | $Li_2CO_3$:$TiO_2$ | 2:1 | $H_2$:He = 8:92 | 28 | 37.0 | 525 |
| Example 4 | $Li_2O$:$TiO_2$ | 2:1 | $H_2$:He = 20:80 | 0 | 43.1 | 612 |
| Example 5 | $Li_2CO_3$:$TiO_2$ | 2:1 | $NH_3$:He = 20:80 | 0 | 43.1 | 612 |
| Example 6 | $Li_2CO_3$:$TiO_2$ | 2:1 | $H_2$:$N_2$ = 10:90 | 5 | 39.3 | 558 |
| Comparative Example 1 | $Li_2CO_3$:$TiO_2$ | 2:1 | $H_2$:Ar = 5:95 | 40 | 29.9 | 425 |
| Comparative Example 2 | $Li_2CO_3$:$TiO_2$ | 2:1 | Ar | 50 | 17.1 | 243 |
| Comparative Example 3 | $Li_2CO_3$:$TiO_2$ | 2:1 | Ar | 69 | 6.8 | 97 |
| Comparative Example 4 | $Li_2CO_3$:$SiO_2$ | 2:1 | Atmosphere | — | 36.7 | 510 |
| Comparative Example 5 | $Li_2CO_3$:$GeO_2$ | 2:1 | Atmosphere | — | 26.8 | 350 |

It was found from Table 1 that the carbon dioxide-absorbing materials of Examples 1 to 6 have large absorption amount of carbon dioxide as compared with Comparative Examples 1 to 5, and therefore have excellent carbon dioxide absorption property. In particular, it was found that the lower the content of $Li_2TiO_3$ in the carbon dioxide-absorbing material, the more excellent the carbon dioxide absorption property, and when the content of $Li_2TiO_3$ is 0 (zero), such a carbon dioxide-absorbing material shows significant carbon dioxide absorption property as compared with the conventional carbon dioxide-absorbing materials. It was further found that the absorbing materials of Examples 1 to 6 have small volume of an absorbing material necessary for absorbing carbon dioxide, from the volume of carbon dioxide absorbed by the absorbing materials having the same volume, and size reduction is achieved.

Electrical resistivity and thermal diffusivity of the carbon dioxide-absorbing materials obtained were measured as follows.

(Measurement Conditions of Electrical Resistivity)

Electrical resistivity of the carbon dioxide-absorbing materials prepared in Examples 1 to 6 and Comparative Examples 1 to 5 was measured by the following method. Disc-shaped pellets having a diameter of 10 mm and a thickness of 3 mm were obtained from the carbon dioxide-absorbing materials prepared in Examples 1 to 6 and Comparative Examples 1 to 5. Those were placed in the commercially available insulation resistance tester (Keithley 6517A, a product of Keithley Instruments) at ordinary temperature. Voltage of 40V was applied, and current value after 1 minute was measured. Electrical resistivity of the samples was obtained from the current value thus obtained, the voltage value, and a thickness and a cross section of the sample. The results are shown in Table 2 below.

(Measurement Conditions of Thermal Diffusivity)

For the measurement of the thermal diffusivity of Examples 1 to 6 and Comparative Examples 1 to 3, a laser flash type thermophysical property measurement device (FA8510B Model), a product of Rigaku Corporation, was used as a measurement device. Pre-treatment of the sample used for measurement was as follows.

To decrease influence of transmission of laser light, the sample was coated such that about 50 nm of gold was deposited on the surface of a laser irradiation side of a disc-shaped pellet sample having a diameter of 10 mm and a thickness of 3 mm, and about 10 nm of gold was deposited on the back thereof. To increase absorption effect of laser light, carbon was applied to the surface of the sample. The sample was placed in the laser flash type thermophysical property measurement device, and thermal diffusivity of the sample was measured. The results are shown in Table 2 below.

TABLE 2

| | Raw materials | Molar ratio of raw materials | Gas atmosphere (vol %) | Electrical resistivity of sample (MΩ · cm) | Thermal diffusivity of sample ($cm^2 \cdot s^{-1} \times 10^{-3}$) |
|---|---|---|---|---|---|
| Example 1 | $Li_2CO_3:TiO_2$ | 2:1 | $H_2$:He = 20:80 | 6.6 | 5 |
| Example 2 | $Li_2CO_3:TiO_2$ | 2:1 | $H_2$:Ar = 10:90 | 20 | 8 |
| Example 3 | $Li_2CO_3:TiO_2$ | 2:1 | $H_2$:He = 8:92 | 53 | 10 |
| Example 4 | $Li_2O:TiO_2$ | 2:1 | $H_2$:He = 20:80 | 6.6 | 5 |
| Example 5 | $Li_2CO_3:TiO_2$ | 2:1 | $NH_3$:He = 20:80 | 6.6 | 5 |
| Example 6 | $Li_2CO_3:TiO_2$ | 2:1 | $H_2$:$N_2$ = 10:90 | 20 | 8 |
| Comparative Example 1 | $Li_2CO_3:TiO_2$ | 2:1 | $H_2$:Ar = 5:95 | 80 | 12 |
| Comparative Example 2 | $Li_2CO_3:TiO_2$ | 2:1 | Ar | 96 | 15 |
| Comparative Example 3 | $Li_2CO_3:TiO_2$ | 2:1 | Ar | 340 | 15 |
| Comparative Example 4 | $Li_2CO_3:SiO_2$ | 2:1 | Atmosphere | 700 | — |
| Comparative Example 5 | $Li_2CO_3:GeO_2$ | 2:1 | Atmosphere | 380 | — |

Table 2 shows that the carbon dioxide-absorbing materials of Examples 1 to 6 have low electrical resistivity as compared with the carbon dioxide-absorbing materials of Comparative Examples 1 to 5, and further have low thermal diffusivity as compared with the carbon dioxide-absorbing materials of Comparative Examples 1 to 3. Therefore, the carbon dioxide-absorbing materials of Examples 1 to 6 have low thermal load posed by temperature rising, and therefore are industrially advantageous.

(Carbon Dioxide Absorption Rate of Carbon Dioxide-Absorbing Material)

The following measurement was conducted to confirm that the carbon dioxide-absorbing material of the invention has high carbon dioxide absorption rate.

Figure 4:
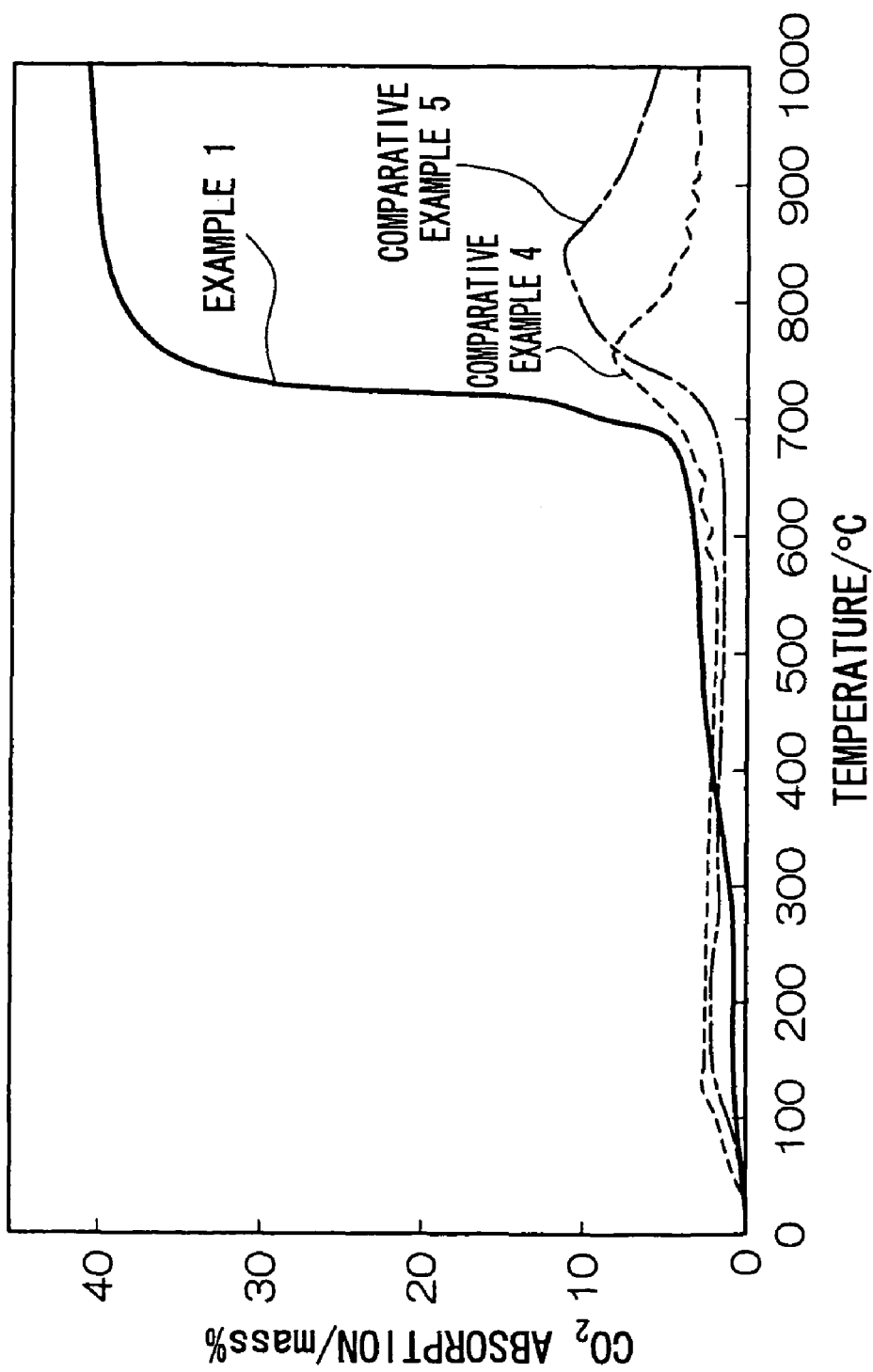
FIG. 4 is a view showing the relationship between temperature of a carbon dioxide-absorbing material and carbon dioxide absorption rate.

The samples (carbon dioxide-absorbing materials) prepared in Example 1, Comparative Example 4 and Comparative Example 5 were heated to 1,000° C. from the ordinary temperature at a temperature-rising rate of 300° C. per minute in a 100% carbon dioxide atmosphere in a thermogravimetric unit (TGD 9600 Model, a product of ULVAC-RIKO, Inc), and the carbon dioxide absorption of each absorbing material was measured. The results are shown in FIG. 4.

It is seen that the carbon dioxide absorption rate in the vicinity of 700° C. of the carbon dioxide-absorbing material of Example 1 is very fast as compared with the rate in Comparative Examples 4 and 5. This result shows that the carbon dioxide-absorbing material of the invention has performance that sufficiently absorbs and fixes carbon dioxide flowing at high rate, for example, carbon dioxide in an exhaust gas flow passage.

DESCRIPTION OF REFERENCE NUMERALS AND SIGNS

10 . . . Reformer
12A, 12B . . . Carbon dioxide separator
14 . . . Combustor

The invention claimed is:

1. A carbon dioxide-absorbing material comprising lithium titanate, the lithium titanate comprising 70 mol % or more of $Li_4TiO_4$ and 30 mol % or less of $Li_2TiO_3$, wherein the carbon dioxide-absorbing material has a maximum carbon dioxide absorption of more than 37% by mass, an electrical resistivity of MΩ·cm or less, and a thermal diffusivity of $10\times10^{-3}$ $cm^2 \cdot s^{-1}$ or less.

2. A method for producing the carbon dioxide-absorbing material of claim 1, which comprises:
   a mixing step of mixing a lithium carbonate powder or a lithium oxide powder with a titanium dioxide powder such that an atomic ratio (Li/Ti) between lithium and titanium is from 3.5 to 5.0, and
   a heat treatment step of subjecting the resulting mixture to a heat treatment at 500 to 1,000° C. in a reducing gas or an inert gas containing a reducing gas.

3. The method for producing a carbon dioxide-absorbing material as claimed in claim 2, wherein the reducing gas is contained in the inert gas in an amount of 8 vol % or more.

4. The method for producing a carbon dioxide-absorbing material as claimed in claim 2, wherein the reducing gas comprises at least one gas selected from the group consisting of hydrogen, ammonia, hydrocarbon and carbon monoxide.

5. The method for producing a carbon dioxide-absorbing material as claimed in claim 4, wherein the reducing gas contains hydrogen gas.

6. The method for producing a carbon dioxide-absorbing material as claimed in claim 4, wherein the reducing gas contains ammonia gas.

7. The method of claim 2, wherein the lithium titanate comprises 100 mol % of $Li_4TiO_4$.

8. A method for absorbing carbon dioxide, comprising a carbon dioxide-absorbing step of absorbing carbon dioxide in the carbon dioxide-absorbing material as claimed in claim 1, wherein the temperature of the carbon dioxide-absorbing material is from 600 to 860° C.

9. An apparatus for absorbing carbon dioxide, comprising carbon dioxide-absorbing means that absorbs carbon dioxide in the carbon dioxide-absorbing material as claimed in claim 1.

10. An apparatus for absorbing carbon dioxide, comprising a carbon dioxide separator filled with the carbon dioxide-absorbing material as claimed in claim 1.

11. The apparatus for absorbing carbon dioxide according to claim 10, wherein the carbon dioxide separator absorbs carbon dioxide in the carbon dioxide-absorbing material.

12. The carbon dioxide-absorbing material of claim 1, wherein the lithium titanate comprises 100 mol % of $Li_4TiO_4$.

13. A carbon dioxide-absorbing material comprising lithium titanate which is obtained by mixing a lithium carbonate powder or a lithium oxide powder with a titanium dioxide powder such that an atomic ratio (Li/Ti) between lithium and titanium is from 3.5 to 5.0, and subjecting the resulting mixture to a heat treatment at 500 to 1,000° C. in a reducing gas or an inert gas containing a reducing gas, wherein the carbon dioxide-absorbing material has a maximum carbon dioxide absorption of more than 37% by mass, an electrical resistivity of MΩ·cm or less, and a thermal diffusivity of $10\times10^{-3}$ $cm^2 \cdot s^{-1}$ or less.

14. The carbon dioxide-absorbing material as claimed in claim 13, wherein the reducing gas is contained in the inert gas in an amount of 8 vol % or more.

15. The carbon dioxide-absorbing material as claimed in claim 13, wherein the reducing gas comprises at least one gas selected from the group consisting of hydrogen, ammonia, hydrocarbon and carbon monoxide.

16. The carbon dioxide-absorbing material as claimed in claim 15, wherein the reducing gas comprises hydrogen gas.

* * * * *